(12) United States Patent
Pai et al.

(10) Patent No.: US 7,764,783 B1
(45) Date of Patent: Jul. 27, 2010

(54) ACOUSTIC ECHO CANCELLATION WITH OVERSAMPLING

(75) Inventors: Wan-Chieh Pai, San Jose, CA (US); Ming Zhang, Cupertino, CA (US)

(73) Assignee: Fortemedia, Inc., Cupertino, CA (US)

( * ) Notice: Subject to any disclaimer, the term of this patent is extended or adjusted under 35 U.S.C. 154(b) by 1157 days.

(21) Appl. No.: 11/390,266

(22) Filed: Mar. 27, 2006

Related U.S. Application Data

(60) Provisional application No. 60/708,339, filed on Aug. 15, 2005.

(51) Int. Cl.
*H04M 9/08* (2006.01)
(52) U.S. Cl. .................................. 379/406.08; 370/286
(58) Field of Classification Search ............ 379/406.01, 379/406.02, 406.06, 406.12, 406.14; 370/286; 455/570
See application file for complete search history.

(56) References Cited

U.S. PATENT DOCUMENTS

| | | | |
|---|---|---|---|
| 4,360,712 A | * | 11/1982 | Horna ................... 379/406.08 |
| 4,609,787 A | * | 9/1986 | Horna ................... 379/406.08 |
| 5,561,668 A | * | 10/1996 | Genter ....................... 370/288 |
| 2004/0136447 A1 | * | 7/2004 | LeBlanc ..................... 375/222 |

* cited by examiner

*Primary Examiner*—Walter F Briney, III
(74) *Attorney, Agent, or Firm*—Thomas, Kayden, Horstemeyer & Risley

(57) ABSTRACT

Techniques for performing acoustic echo cancellation are described. An ADC oversamples an analog signal from a microphone and provides a near-end signal having a wider bandwidth than the bandwidth of a communication channel. A subband filter receives and filters the near-end signal, provides an in-band signal having spectral components in a frequency band of interest, and provides an out-of-band signal having spectral components in at least one other frequency band. An adaptive filter receives a reference signal and the in-band signal, derives an echo estimate signal with the reference signal, cancels a portion of the echo in the in-band signal with the echo estimate signal, and provides an intermediate signal. A double-talk detector detects for double talk based on the out-of-band signal and the intermediate signal, e.g., by determining a power ratio based on the powers of the out-of-band and intermediate signals and detecting for double talk based on the power ratio.

15 Claims, 6 Drawing Sheets

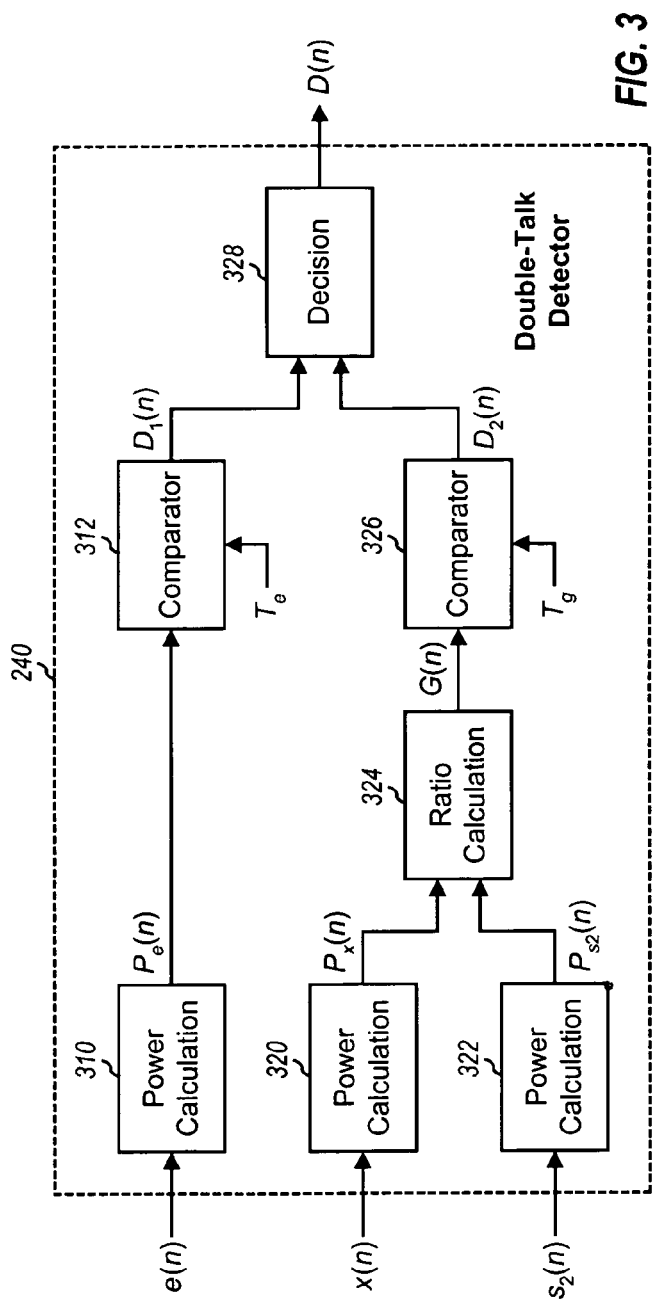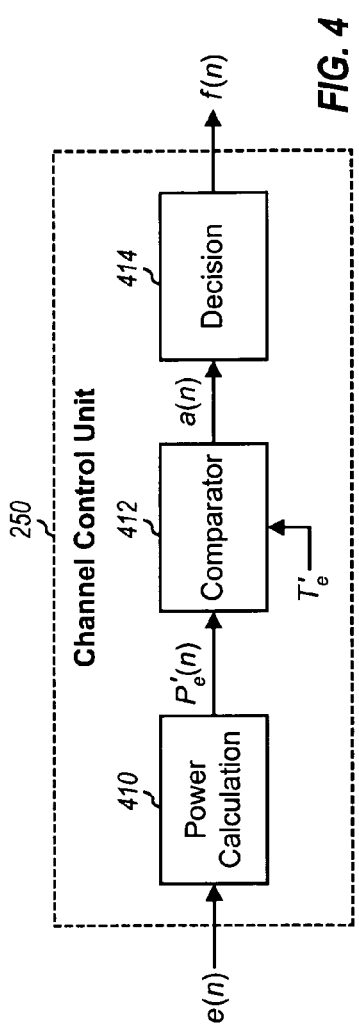

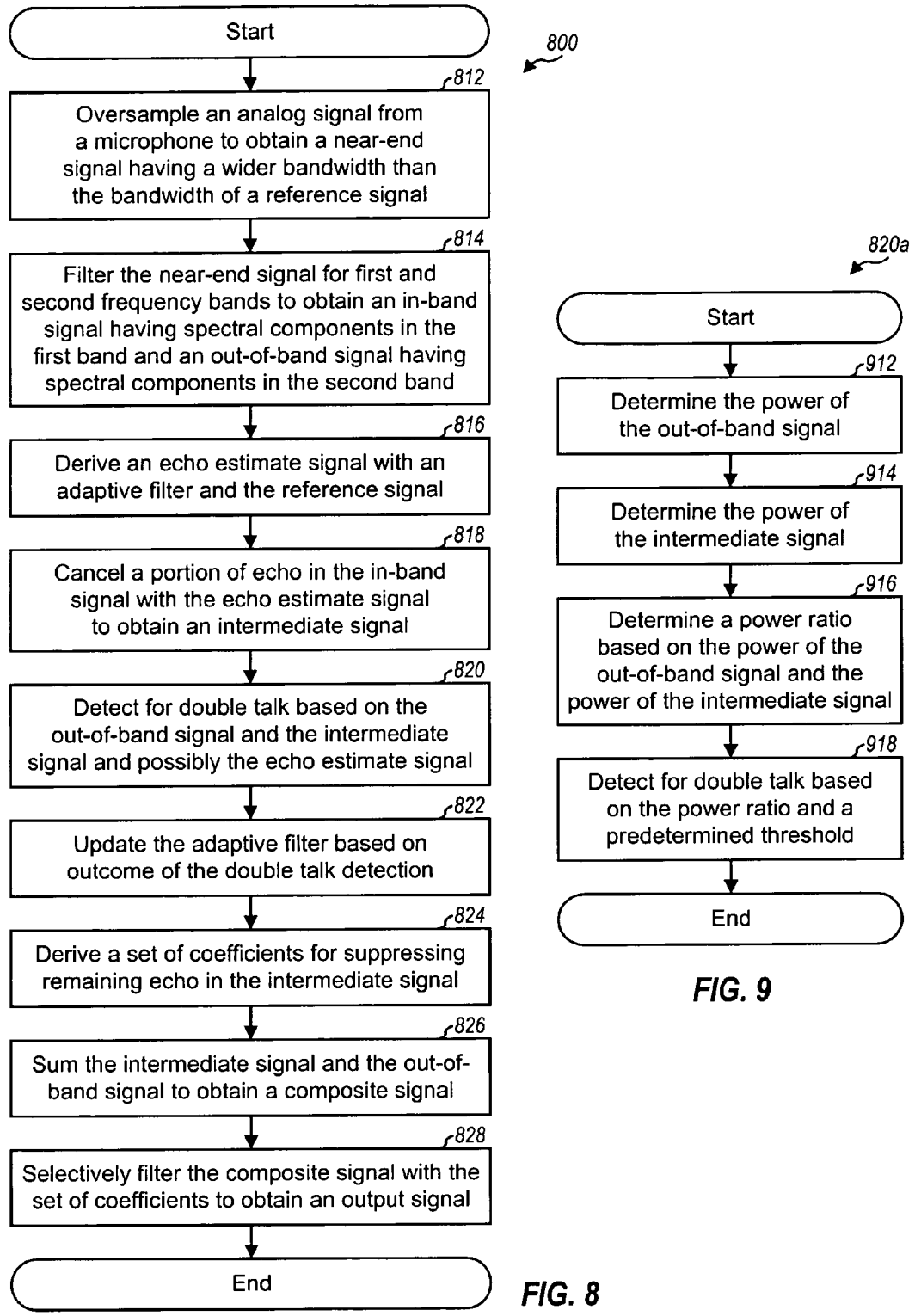

ACOUSTIC ECHO CANCELLATION WITH OVERSAMPLING

CROSS-REFERENCES TO RELATED APPLICATIONS

This application claims the benefit of provisional U.S. Application Ser. No. 60/708,339, entitled "Soft-decision Double Talk Detector" filed Aug. 15, 2005, which is incorporated herein by reference.

BACKGROUND

The present invention relates generally to signal processing, and more specifically to techniques for canceling acoustic echo.

Hands-free full-duplex communication systems are widely used for various applications such as speakerphone, hands-free car kit, teleconferencing system, cellular phone, and so on. Full-duplex refers to simultaneous two-way communication between a near-end user and a far-end user. In a hands-free full-duplex system, a speaker at the near-end site emits an acoustic signal from the far-end user. A microphone at the near-end site picks up an acoustic signal from the near-end user as well as a portion of the acoustic signal emitted by the speaker and reflections from the borders of an enclosure, such as a room or the interior of a car. The microphone signal is processed and sent to the far-end user, who would be annoyed at listening to his/her own voice delayed by the signal path in the system. This acoustic disturbance is referred to as echo. In certain instances, instability in the system may result in the echo causing howling, which is highly undesirable.

Echo cancellation is used in many communication systems to combat echo as well as to prevent howling. For example, echo cancellation is typically used in a hands-free full-duplex environment, such as a vehicle or a room, where the speaker and microphone may be located some distance from a user. Conventionally, echo cancellation is achieved with a circuit that employs an adaptive filter. This adaptive filter may implement a least mean square (LMS) algorithm or a normalized least mean square (NLMS) algorithm. The adaptive filter performs echo cancellation based on a reference signal, which may be a line input from a communication or telematics device such as a cellular phone or some other device. The adaptive filter is typically able to remove a portion of the echo that is correlated to the reference signal.

However, conventional echo cancellation techniques are often not able to provide good full-duplex performance. This is particularly true for echo resulting from non-linearity of circuitry in the communication systems. Such circuitry may include, e.g., the speaker, analog-to-digital converter (ADC), digital-to-analog converter (DAC), and so on, which generates echo that is not correlated to the reference signal. Good full-duplex performance is highly desirable for natural conversation between multiple parties.

As can be seen, techniques that can effectively cancel acoustic echo for good full-duplex performance in communication systems are highly desirable.

SUMMARY

Techniques to provide good full-duplex performance and improved voice quality are described herein. In an embodiment, an acoustic echo canceller includes an ADC, a subband filter, an adaptive filter, and a double-talk detector. The ADC oversamples an analog signal from a microphone and provides a near-end signal having a wider bandwidth than the bandwidth of a communication channel. For example, if the communication channel has a bandwidth of 300 Hz to 3.4 KHz, then the ADC may sample the analog signal at a sampling rate of 16 KHz, and the near-end signal would then have a bandwidth of 8 KHz. The subband filter receives and filters the near-end signal for a frequency band of interest and at least one other frequency band, provides an in-band signal having spectral components in the frequency band of interest (e.g., 300 Hz to 3.4 KHz), and provides an out-of-band signal having spectral components in the at least one other frequency band (e.g., 100 Hz to 300 Hz and 4 KHz to 8 KHz).

The adaptive filter receives a reference signal and the in-band signal, derives an echo estimate signal with the reference signal, cancels a portion of the echo in the in-band signal with the echo estimate signal, and provides an intermediate signal. The reference signal has spectral components in the bandwidth of the communication channel. The adaptive filter may implement an LMS, an NLMS or some other adaptive algorithm.

The double-talk detector detects for double talk based on the out-of-band signal and the intermediate signal. The double-talk detector may determine the power of the out-of-band signal and the power of the intermediate signal, determine a power ratio based on the powers of the out-of-band and intermediate signals, detect for double talk based on the power ratio, and provide a control signal indicative of presence of double talk. The double-talk detector may also detect for double talk based on the in-band signal, the echo estimate signal, the reference signal, and/or some other signal.

The intermediate signal may be further processed to obtain an output signal. For example, the intermediate signal may be selectively filtered to remove remaining echo in the signal. This filtering may be performed, e.g., whenever a large amount of echo is detected.

Various aspects, embodiments, and features of the invention are described in further detail below.

BRIEF DESCRIPTION OF THE DRAWINGS

FIG. 3 shows a block diagram of a double-talk detector.

FIG. 4 shows a block diagram of a channel control unit.

FIG. 8 shows a process for performing acoustic echo cancellation.

FIG. 9 shows a process for detecting for double talk.

DETAILED DESCRIPTION

Figure 1:
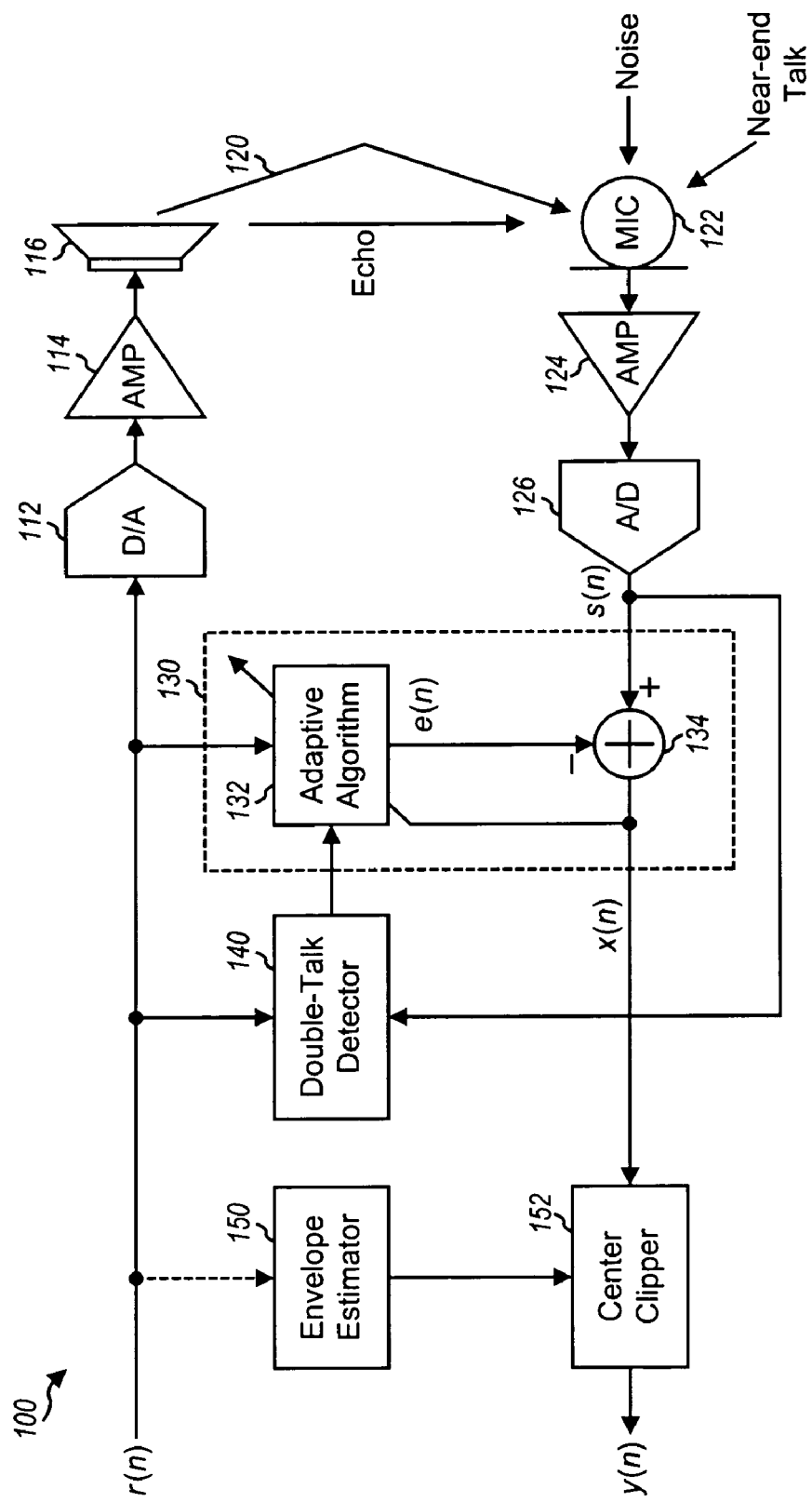
FIG. 1 shows a block diagram of a conventional echo cancellation system.

FIG. 1 shows a block diagram of a conventional echo cancellation system 100. In the "output path", a digital signal r(n), which includes audio activity (e.g., speech) from a far-end source, is converted to an analog signal by a digital-to-analog converter (DAC) 112, amplified by an amplifier (AMP) 114, and outputted from a speaker 116 to one or more near-end users. A far-end user is one who is located away (or remote) from system 100, and a near-end user is one who is located within the vicinity of system 100. The far-end signal r(n) is also used as a reference signal for an adaptive filter 130.

In the "input path", a microphone (MIC) 122 receives audio activity from a near-end source (e.g., near-end voice or talk), local ambient noise, and echo from speaker 116 via echo paths 120. The signal from microphone 122 is amplified by an amplifier 124 and further digitized by an analog-to-digital converter (ADC) 126 to obtain a digitized near-end signal s(n).

A double-talk detector 140 receives and processes the far-end signal r(n) and the near-end signal s(n) to determine whether or not double talk exists. Near-end talk refers to audio activity (e.g., speech) from a near-end user, far-end talk refers to audio activity from a far-end user, and double talk refers to a situation when both near-end talk and far-end talk are present. For a teleconference system, the near-end talk may come from users within the room where the teleconference system is installed, and the far-end talk may come from users outside the room. Double-talk detector 140 provides a double-talk control signal to adaptive filter 130. This control signal indicates whether or not double talk is present and is used to control the updating of adaptive filter 130.

Adaptive filter 130 receives the reference signal r(n), the double-talk control signal, and the near-end signal s(n). Adaptive filter 130 filters the reference signal r(n) based on an adaptive algorithm 132 and generates an echo estimate signal e(n), which is an estimate of the echo in the near-end signal s(n). A summer 134 subtracts the echo estimate signal e(n) from the near-end signal s(n) and provides an intermediate signal x(n). The intermediate signal x(n) is fed back to adaptive algorithm 132 and used to update the coefficients of the filter.

Adaptive algorithm 132 is updated whenever far-end talk is detected and double talk is not detected, e.g., when the near-end signal s(n) includes mostly echo from the far-end or reference signal r(n). If the echo cancellation by adaptive filter 130 is effective, then the echo estimate signal e(n) is approximately equal to the near-end signal s(n) when double talk is not present, and the intermediate signal x(n) would be small. However, in a typical implementation, at least a portion of the echo cannot be canceled by adaptive filter 130. In this case, the intermediate signal x(n) would include the remaining echo that has not been canceled. The remaining echo may include components due to various factors such as (1) changes in echo paths, (2) non-linearity in amplifier 114, speaker 116, microphone 122, amplifier 124, and/or ADC 126 when the volume is high, (3) an inadequate number of taps in adaptive algorithm 132 to accurately estimate the echo, and (4) possibly other factors.

A center clipper unit 152 processes the intermediate signal x(n) to remove as much of the remaining echo as possible and provides an output signal y(n). Center clipper unit 152 is controlled by an envelope estimation unit 150. Center clipper unit 152 is known in the art and not described herein.

Conventional echo cancellation system 100 suffers from several shortcomings. ADC 126 typically operates at a sampling rate that is about twice the highest frequency of the communication band. As an example, for a conventional voice band of 300 Hertz (Hz) to 3.4 kilo Hertz (KHz), the sampling rate of ADC 126 may be 8 KHz. In this case, the near-end signal s(n) derived from microphone 122 has almost the same signal bandwidth as the far-end signal r(n), which is not effective for double-talk detection, particularly for cases of strong echo.

Figure 2:
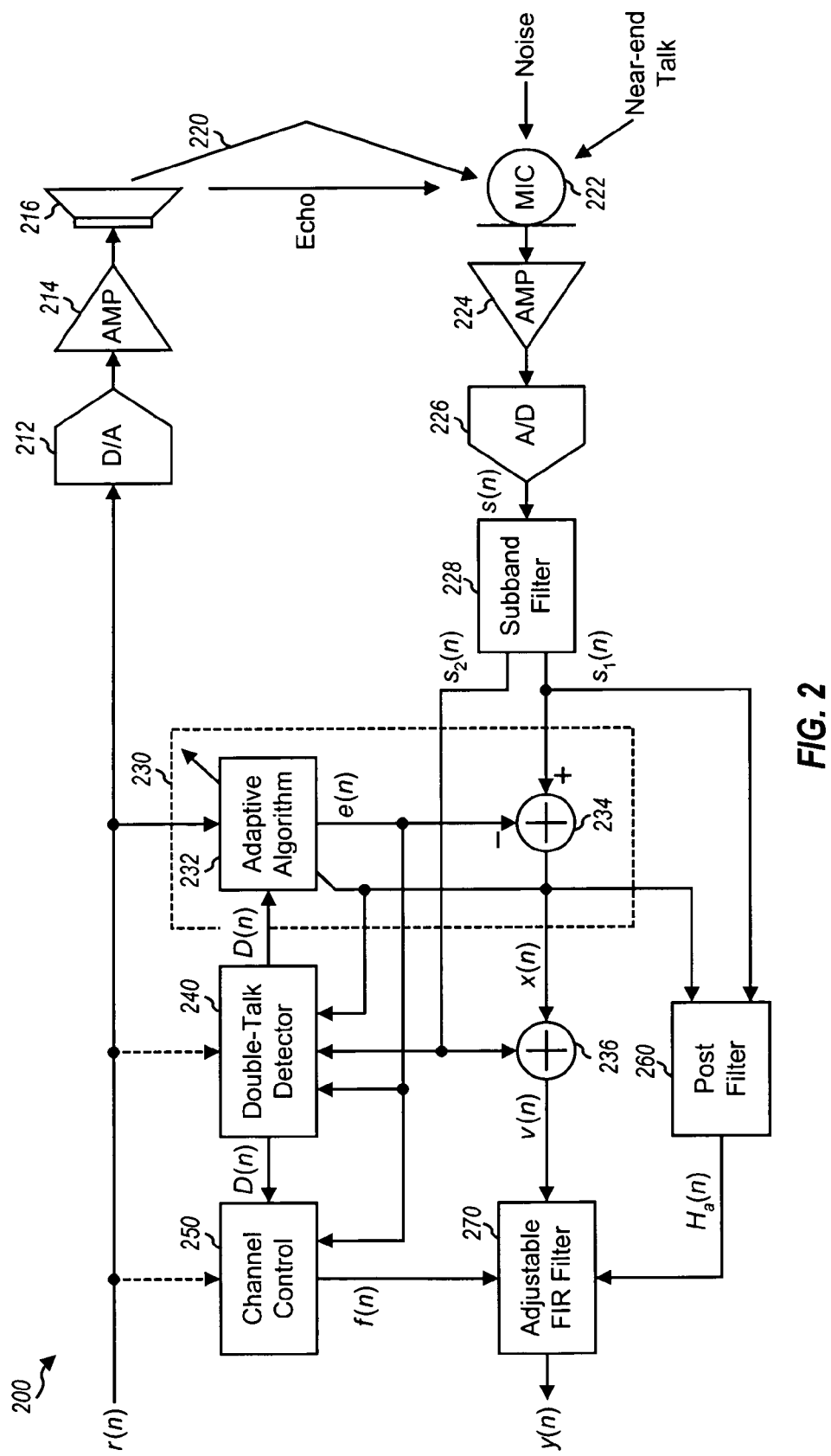
FIG. 2 shows a block diagram of a novel echo cancellation system.

FIG. 2 shows a block diagram of an embodiment of an echo cancellation system 200 with improved performance. In the output path, the far-end signal r(n) is converted to an analog signal by a DAC 212, amplified by an amplifier 214, and outputted from a speaker 216 to one or more near-end users. The far-end signal r(n) is also used as the reference signal for an adaptive filter 230.

In the input path, a microphone 222 receives near-end voice, local ambient noise, and echo from speaker 216 via echo paths 220. The signal from microphone 222 is amplified by an amplifier 224 and further digitized by an ADC 226 to obtain a digitized near-end signal s(n). In an embodiment, the sampling rate of ADC 226 is selected to oversample the analog signal from microphone 222. The communication channel for voice may have a bandwidth of 300 Hz to 3.4 KHz, and the far-end signal r(n) would then have spectral components in this voice band. For this communication channel, a sampling rate of 16 KHz may be used for ADC 226, and the microphone signal would then be oversampled by a factor of two. Other oversampling ratio may also be used for ADC 226.

In an embodiment, a subband filter 228 filters the near-end signal s(n) for multiple frequency bands or subbands and provides an in-band signal $s_1(n)$ and an out-of-band signal $s_2(n)$. The in-band signal $s_1(n)$ contains spectral components within the communication band, e.g., from 300 Hz to 3.4 KHz for the example above. The out-of-band signal $s_2(n)$ contains spectral components outside of the communication band, e.g., from 4 KHz to 8 KHz as well as 100 Hz to 300 Hz for the example above. In general, the techniques described herein may be used for a communication channel with any bandwidth. An appropriate sampling rate for ADC 226 and appropriate frequency bands for subband filter 228 may be selected based on the bandwidth of the communication channel. For clarity, certain details are specifically described below for the exemplary communication channel with a bandwidth of 300 Hz to 3.4 KHz.

Adaptive filter 230 receives the reference signal r(n), the in-band signal $s_1(n)$, and a control signal D(n) from a double-talk detector 240. Adaptive filter 230 filters the reference signal r(n) based on an adaptive algorithm 232 and generates an echo estimate signal e(n), which is an estimate of the echo in the near-end signal s(n). A summer 234 subtracts the echo estimate signal e(n) from the in-band signal $s_1(n)$ and provides an intermediate signal x(n). The intermediate signal x(n) is fed back to adaptive algorithm 232 and used to update the coefficients of the filter. The intermediate signal x(n) is also provided to double-talk detector 240 and used to generate the double-talk control signal D(n).

In the embodiment shown in FIG. 2, adaptive filter 230 performs linear acoustic echo cancellation on only the in-band signal $s_1(n)$. The out-of-band signal $s_2(n)$ is not used for linear acoustic echo cancellation because the reference signal r(n) is limited to 3.4 KHz and does not contain reference signal component in the 4 KHz to 8 KHz range. The in-band signal $s_1(n)$ contains both linear and non-linear echo, and adaptive filter 230 only cancels the linear echo. Thus, the intermediate signal x(n) contains both voice signal and non-linear echo. The non-linear echo may be stronger or weaker than the voice signal in the voice band from 300 Hz to 3.4 KHz. In contrast, the out-of-band signal $s_2(n)$ contains mostly voice signal in the higher band from 4 KHz to 8 KHz.

Double-talk detector 240 may be used to control the updating of adaptive filter 230. Double-talk detector 240 processes the echo estimate signal e(n), the out-of-band signal $s_2(n)$, and the intermediate signal x(n) to determine whether or not double talk exists. If multiple microphones are present, then the signal from a main microphone, and not the signal from a reference microphone, is used for double-talk detection. Double-talk detector 240 provides the double-talk control signal D(n), which indicates whether or not double talk is present.

If double-talk detector 240 is used to control the updating of adaptive filter 230, then adaptive algorithm 232 is updated whenever far-end talk is detected and double talk is not detected. In this case, the near-end signal s(n) includes mostly the echo from the far-end or reference signal r(n).

A summer 236 adds the intermediate signal x(n) with the out-of-band signal $s_2(n)$ and provides a composite signal v(n). A post filter 260 receives the in-band signal $s_1(n)$, the intermediate signal x(n), and the double-talk control signal D(n). Post filter 260 processes the in-band signal $s_1(n)$ and the intermediate signal x(n) based on the double talk control signal D(n) and provides a set of coefficients $H_a(n)$ for an adjustable finite impulse response (FIR) filter 270. FIR filter 270 removes as much of the remaining echo in the composite signal v(n) as possible with the coefficients $H_a(n)$ and provides an output signal y(n).

A channel control unit 250 receives the reference signal r(n) and the double-talk control signal D(n) and generates a control signal f(n) for adjustable FIR filter 270.

Full-duplex conversation is highly desirable in hands-free full-duplex communication systems such as speakerphone systems. A reliable double-talk detector is typically instrumental in achieving high fidelity full-duplex communication while maintaining clean acoustic echo cancellation. The double-talk detector should remain 'off' when acoustic echo alone is present and should be 'on' when both acoustic echo and desired voice are present at the same time.

Conventional double-talk detectors typically examine the power of a signal that is believed to be non-echo and return true upon detecting significant power on this signal. This type of double-talk detectors, if well designed, can often pick up peaks in near-end voice, which is the desired signal. These double-talk detectors are typically effective at detecting vowel parts with a talker's mouth wide open but are usually unable to detect consonant parts such as "k", "s", "t", and so on. This limited detection capability may result in rather ineffective two-way conversation because the weak parts of voice are usually important to understanding a conversation. These weak voice parts may be suppressed if the conventional double-talk detectors cannot detect them.

In an aspect, a soft-decision double-talk detector that is capable of detecting consonant speech parts is described. The soft-decision double-talk detector utilizes extra bandwidth for the voice signal from the microphone in comparison to the voice signal from the speaker to complement a conventional double-talk detector. The soft-decision double-talk detector can provide high fidelity two-way conversation for hands-free full-duplex systems.

FIG. 3 shows a block diagram of an embodiment of soft-decision double-talk detector 240, which is capable of detecting consonant speech parts. In this embodiment, double-talk detector 240 receives the echo estimate signal e(n) and the intermediate signal x(n) from adaptive filter 230 and the out-of-band signal $s_2(n)$ from subband filter 228. Within double-talk detector 240, a power calculation unit 310 computes the power $P_e(n)$ of the echo estimate signal e(n). A comparator 312 compares the echo power $P_e(n)$ against an echo power threshold $T_e$ and generates a first indicator signal $D_1(n)$, as follows:

$$D_1(n) = \begin{cases} 1, & \text{if } P_e(n) \leq T_e, \text{ and} \\ 0, & \text{if } P_e(n) > T_e. \end{cases} \quad \text{Eq (1)}$$

A power calculation unit 320 computes the power $P_x(n)$ of the intermediate signal x(n). A power calculation unit 322 computes the power $P_{s2}(n)$ of the out-of-band signal $s_2(n)$. A ratio calculation unit 324 receives the powers $P_x(n)$ and $P_{s2}(n)$ and computes a power ratio G(n), as follows:

$$G(n) = k \cdot \frac{P_{s2}(n)}{P_x(n) + P_{s2}(n)}, \quad \text{Eq (2)}$$

where k is a constant. The power ratio G(n) ranges from 0 to 1, with G(n)=0 corresponding to pure echo and G(n)=1 corresponding to pure near-end voice.

A comparator 326 compares the power ratio G(n) against a threshold $T_g$ and generates a second indicator signal $D_2(n)$, as follows:

$$D_2(n) = \begin{cases} 1, & \text{if } G(n) \leq T_g, \text{ and} \\ 0, & \text{if } G(n) > T_g. \end{cases} \quad \text{Eq (3)}$$

A decision unit 328 receives the first indicator signal $D_1(n)$ and the second indicator signal $D_2(n)$ and generates the double-talk control signal D(n), which is a final decision for the double-talk detection, as follows:

$$D(n) = \begin{cases} 1, & \text{if } D_1(n) = 0 \text{ OR } D_2(n) = 1, \text{ and} \\ 0, & \text{Otherwise.} \end{cases} \quad \text{Eq (4)}$$

In the embodiment shown in equation (4), double talk is detected if the echo power $P_e(n)$ is greater than the threshold $T_e$ or if the power ratio G(n) is less than the threshold $T_g$. Double-talk detection may also be performed based on other signals and/or criteria besides those described above.

Full-duplex performance may be improved in several ways when high power ratio G(n), which is indicative of pure near-end voice, is detected. One way is to reduce the amount of non-linear echo suppression by adjustable FIR filter 270 that follows linear adaptive filter 230. Another way is to dynamically reduce the speaker volume so that the near-end voice power can dominate the residue echo power more easily. This may be achieved by generating a control signal that reduces the gain of amplifier 214 in FIG. 2 when high power ratio G(n) is detected.

FIG. 4 shows a block diagram of an embodiment of channel control unit 250. Within unit 250, a power calculation unit 410 computes the power $P'_e(n)$ of the echo estimate signal e(n). Unit 410 may further average the echo power $P'_e(n)$. A comparator 412 compares the averaged or unaveraged echo power $P'_e(n)$ against an echo power threshold $T'_e$ to obtain an indicator signal a(n), which may be expressed as:

$$a(n) = \begin{cases} 1, & \text{if } P'_e(n) < T'_e, \text{ and} \\ 0, & \text{if } P'_e(n) \geq T'_e. \end{cases} \quad \text{Eq (5)}$$

A decision unit 414 receives the indicator signal a(n) and derives the control signals f(n) for adjustable FIR filter 270, as follows:

$$f(n) = \begin{cases} 1, & \text{if } a(n) = 1, \text{ and} \\ 0, & \text{otherwise.} \end{cases} \quad \text{Eq (6)}$$

As shown in equations (5) and (6), if the echo power $P'_e(n)$ is small, indicating that only or mostly near-end signal is present, then the control signal f(n) is set to logic high. Otherwise, the control signal f(n) is set to logic low.

Figure 5:
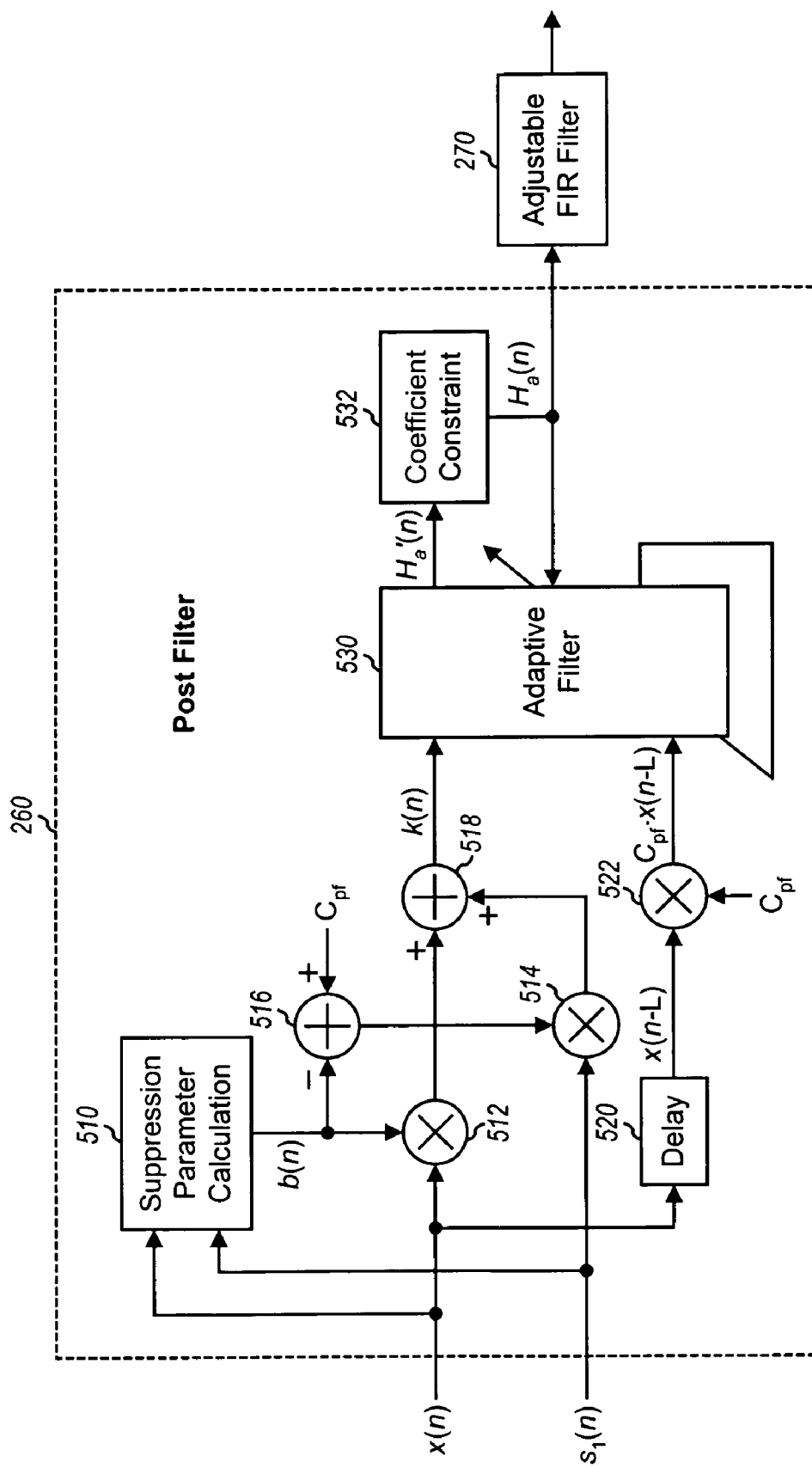
FIG. 5 shows a block diagram of a post filter.

FIG. 5 shows a block diagram of an embodiment of post filter 260. In this embodiment, within post filter 260, a suppression parameter calculation unit 510 processes the intermediate signal x(n) and the in-band signal $s_1(n)$ and provides a suppression parameter b(n) that indicates the amount of cross-correlation between the signals x(n) and $s_1(n)$. A multiplier 512 multiplies the suppression parameter b(n) with the intermediate signal x(n) and provides a scaled intermediate signal b(n)·x(n).

A summer 516 subtracts the suppression parameter b(n) from a constant $C_{pf}$ (e.g., $C_{pf}=1$) and provides a second parameter, $C_{pf}-b(n)$. A multiplier 514 multiplies the in-band signal $s_1(n)$ with the second parameter and provides a scaled in-band signal $[C_{pf}-b(n)]\cdot s_1(n)$. A summer 518 sums the two scaled signals from multipliers 512 and 514 and provides a combined signal k(n). If $C_{pf}=1$, then the combined signal may be expressed as:

$$k(n)=b(n)\cdot x(n)+[1-b(n)]\cdot s_1(n). \quad \text{Eq (7)}$$

A delay element 520 delays the intermediate signal x(n) by L samples and provides a delayed intermediate signal x(n−L). A multiplier 522 multiplies the signal x(n−L) with the constant $C_{pf}$ and provides a scaled signal that is used as an input signal for an adaptive filter 530.

Adaptive filter 530 receives the combined signal k(n) and its input signal $C_{pf}\cdot x(n-L)$, processes these two signals, and provides a set of coefficients $H'_a(n)$. Adaptive filter 530 updates the coefficients $H'_a(n)$ in a manner to minimize the mean square error between the signal k(n) and the input signal $C_{pf}\cdot x(n-L)$. Adaptive filter 530 may be implemented using the same design as adaptive filter 230 and may implement an LMS, NLMS or some other adaptive algorithm.

A coefficient constraint unit 532 receives the coefficients $H'_a(n)$ from adaptive filter 530, limits the magnitude of these coefficients to within a particular range of values, and provides constrained coefficients $H_a(n)$. Coefficient constraint unit 532 may be used to ensure stability and to prevent other deleterious effects.

The coefficients $H'_a(n)$ may be updated by adaptive filter 530 as follows:

$$H'_a(n)=H_a(n-1)+\Delta H_a(n). \quad \text{Eq (8)}$$

where $H_a(n-1)$ is the constrained coefficient vector provided by coefficient constraint unit 532 for the previous update interval n−1, and $\Delta H_a(n)$ is the amount of adjustment for the constrained coefficients $H_a(n-1)$ to obtain the coefficients $H'_a(n)$ for the current update interval n.

The adjustment $\Delta H_a(n)$ may be derived, for example, based on the NLMS algorithm. Coefficient constraint unit 532 then derives the constrained coefficients $H_a(n)$ based on the coefficients $H'_a(n)$ and provides the coefficients $H_a(n)$ to adjustable FIR filter 270.

Figure 6:
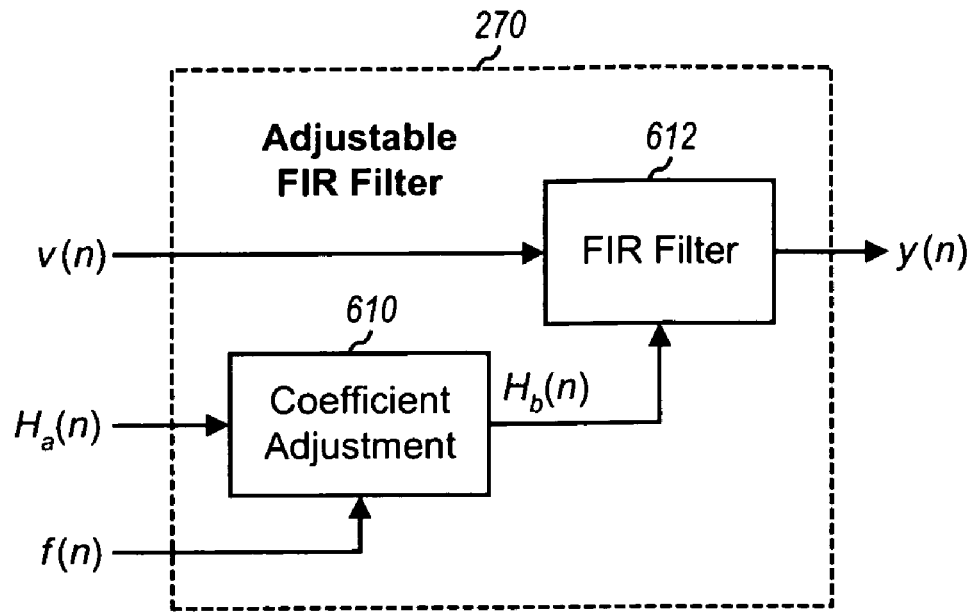
FIG. 6 shows a block diagram of an adaptive FIR filter.

FIG. 6 shows a block diagram of an embodiment of adjustable FIR filter 270. Within filter 270, a coefficient adjustment unit 610 receives and adjusts the vector of coefficients $H_a(n)$ from post filter 260 based on the control signal f(n) from channel control unit 250. In an embodiment, the adjusted coefficients $H_b(n)$ are derived as follows:

$$H_b(n) = \begin{cases} \delta(n), & \text{if } f(n) = 1, \text{ and} \\ H_a(n), & \text{otherwise,} \end{cases} \quad \text{Eq (9)}$$

where $\delta(n)$ is an impulse vector having the same number of coefficients as vector $H_a(n)$ and is defined as:

$$\delta(n) = \begin{cases} \delta_m(n) = 1, & \text{for } m = \text{index of the middle coefficient of } H_a(n) \\ \delta_i(n) = 0, & \text{for } i \neq m. \end{cases} \quad \text{Eq (10)}$$

An FIR filter 612 receives and filters the composite signal v(n) from summer 236 with the adjusted coefficients $H_b(n)$ and provides the output signal y(n). If the control signal f(n) is set to logic high, indicating that only or mostly near-end signal is present, then the adjusted coefficients $H_b(n)$ are set to the impulse vector $\delta(n)$ and the FIR filtering is effectively bypassed, i.e., not performed. Otherwise, if the control signal f(n) is set to logic low, indicating that a large amount of echo is detected, then the adjusted coefficients $H_b(n)$ are set to the coefficients $H_a(n)$ and the filtering is performed based on these coefficients to further suppress the remaining echo.

Figure 7:
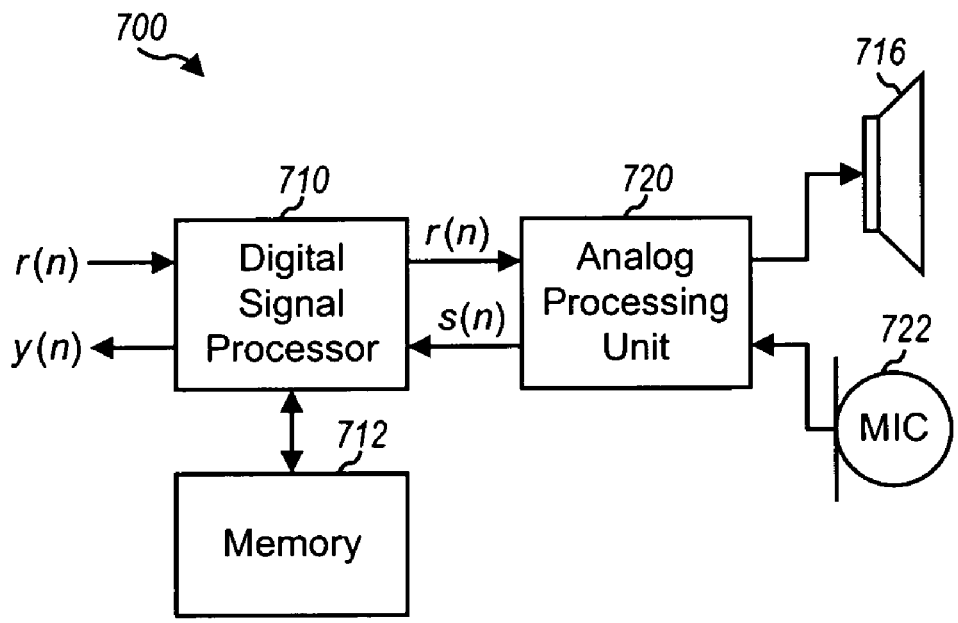
FIG. 7 shows a diagram of an implementation of the echo cancellation system.

FIG. 7 shows a diagram of an implementation of an echo cancellation system 700. In this implementation, system 700 includes a digital signal processor (DSP) 710, a memory 712, an analog processing unit 720, a speaker 716, and a microphone 722. Digital signal processor 710 may be designed to implement various processing units for echo suppression, such as the processing units shown in FIG. 2. Memory 712 stores program codes and data used by signal processor 710. Analog processing unit 720 performs analog processing and may include DAC 212 and amplifier 214 in the output path and amplifier 224 and ADC 226 in the input path. Digital signal processor 710 may implement the remaining processing units of system 200.

FIG. 8 shows an embodiment of a process 800 for performing acoustic echo cancellation. An analog signal from a microphone is oversampled to obtain a near-end signal s(n) having a wider bandwidth than the bandwidth of a reference signal received via a communication channel (block 812). The near-end signal s(n) is filtered for first and second frequency bands to obtain an in-band signal $s_1(n)$ having spectral components in the first frequency band and an out-of-band signal $s_2(n)$ having spectral components in the second frequency band (block 814). An echo estimate signal e(n) is derived with an adaptive filter and the reference signal r(n) (block 816). A portion of the echo in the in-band signal $s_1(n)$ is canceled with the echo estimate signal e(n) to obtain an intermediate signal x(n) (block 818). Double talk is detected based on the out-of-band signal $s_2(n)$ and the intermediate signal x(n) and possibly the echo estimate signal e(n) (block 820). The adaptive filter is updated based on the outcome of the double-talk detection (block 822). A set of coefficients $H_a(n)$ used for suppressing the remaining echo in the intermediate signal may be derived (block 824). The intermediate signal and the out-of-band signal may be summed to obtain a composite signal v(n) (block 826). The composite signal may be selectively filtered with the set of coefficients to obtain an output signal y(n) (block 828).

FIG. 9 shows an embodiment of a process 820a for detecting for double talk. Process 820a may be used for step 820 in FIG. 8. The power of the out-of-band signal is determined (block 912). The power of the intermediate signal is also determined (block 914). A power ratio is determined based on the power of the out-of-band signal and the power of the intermediate signal (block 916). Double talk is then detected based on the power ratio and a predetermined threshold (block 918).

The techniques described herein may be implemented by various means. For example, these techniques may be implemented in hardware, software, firmware, or a combination thereof. For a hardware implementation, the processing units used to implement the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software and/or firmware implementation, the techniques may be implemented with modules (e.g., procedures, functions, and so on) that perform the functions described herein. The software and/or firmware codes may be stored in a memory unit (e.g., memory 712 in FIG. 7) and executed by a processor (e.g., digital signal processor 710). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
    an analog-to-digital converter (ADC) operative to oversample an analog signal from a microphone and to provide a near-end signal having a wider bandwidth than bandwidth of a reference signal received via a communication channel;
    a subband filter operative to filter the near-end signal for a frequency band of interest and at least one other frequency band, to provide an in-band signal having spectral components in the frequency band of interest, and to provide an out-of-band signal having spectral components in the at least one other frequency band;
    an adaptive filter operative to receive the reference signal and the in-band signal, to derive an echo estimate signal with the reference signal, to cancel a portion of echo in the in-band signal with the echo estimate signal, and to provide an intermediate signal; and
    a double-talk detector operative to detect for double talk based on the out-of-band signal and the intermediate signal and to provide a control signal indicative of presence of double talk, and wherein the adaptive filter is updated based on the control signal,
    wherein the double-talk detector is operative to determine a power ratio based on the power of the out-of-band signal and the power of the intermediate signal and to detect for double talk based on the power ratio, and the double-talk detector is operative to determine the power ratio as:

$$G(n) = k \cdot \frac{P_{s2}(n)}{P_x(n) + P_{s2}(n)},$$

where $P_{s2}(n)$ is the power of the out-of-band signal in time interval n,
$P_x(n)$ is the power of the intermediate signal in time interval n,
k is a constant, and
$G(n)$ is the power ratio in time interval n.

2. The apparatus of claim 1, wherein the frequency band of interest corresponds to bandwidth of echo in the near-end signal, and wherein the at least one other frequency band does not overlap the frequency band of interest.

3. The apparatus of claim 1, wherein the frequency band of interest is approximately 300 Hz to 3.4 KHz.

4. The apparatus of claim 1, wherein the at least one other frequency band comprises a frequency band from approximately 4 KHz to 8 KHz.

5. The apparatus of claim 1, wherein the out-of-band signal comprises spectral components that are different from spectral components of echo in the near-end signal, and wherein the double-talk detector is operative to utilize power of the out-of-band signal to detect for double talk.

6. The apparatus of claim 1, wherein the double-talk detector is operative to determine power of the out-of-band signal and power of the intermediate signal, and to detect for double talk based on the power of the out-of-band signal and the power of the intermediate signal.

7. The apparatus of claim 6, wherein the double-talk detector is operative to receive the echo estimate signal and to declare double talk if the power of the echo estimate signal exceeds a predetermined threshold.

8. The apparatus of claim 1, wherein the double-talk detector is operative to declare double talk if the power ratio is less than a predetermined threshold.

9. The apparatus of claim 1, wherein the double-talk detector is operative to detect for double talk based on the out-of-band signal, the intermediate signal, and the in-band signal.

10. The apparatus of claim 1, further comprising:
    a post filter operative to derive a set of coefficients for suppressing remaining echo in the intermediate signal;
    a summer operative to sum the intermediate signal and the out-of-band signal and provide a composite signal; and
    an adjustable filter operative to selectively filter the composite signal with the set of coefficients and provide an output signal.

11. The apparatus of claim 10, wherein the post filter is operative to derive a variable suppression parameter based on the intermediate signal and the in-band signal and to derive the set of coefficients with the variable suppression parameter.

12. The apparatus of claim 10, wherein the adjustable filter is operative to filter the composite signal with the set of coefficients if a large amount of echo is detected and to pass the composite signal otherwise.

13. The apparatus of claim 12, further comprising:
    a control unit operative to determine power of the echo estimate signal and to detect for the large amount of echo based on the power of the echo estimate signal.

14. A method comprising:
    filtering a near-end signal for a frequency band of interest and at least one other frequency band to obtain an in-band signal having spectral components in the frequency band of interest and an out-of-band signal having spectral components in the at least one other frequency band;
    deriving an echo estimate signal with an adaptive filter and a reference signal;
    canceling a portion of echo in the in-band signal with the echo estimate signal to obtain an intermediate signal;

determining power of the out-of-band signal and power of the intermediate signal to determine a power ratio;
detecting for double talk based on the power ratio; and
updating coefficients of the adaptive filter based on outcome of the double talk detection,
wherein the power ratio is determined as:

$$G(n) = k \cdot \frac{P_{s2}(n)}{P_x(n) + P_{s2}(n)}.$$

where $P_{s2}(n)$ is the power of the out-of-band signal in time interval n, $P_x(n)$ is the power of the intermediate signal in time interval n, k is a constant, and G(n) is the power ratio in time interval n.

15. The method of claim 14, further comprising:
deriving a set of coefficients for suppressing remaining echo in the intermediate signal;
summing the intermediate signal and the out-of-band signal to obtain a composite signal; and
selectively filtering the composite signal with the set of coefficients to obtain an output signal.

* * * * *